Sept. 19, 1933.     M. H. DICKINSON     1,927,700
FLUID PRESSURE MULTIPLE VALVE CONTROL
Filed Oct. 13, 1930     3 Sheets-Sheet 1
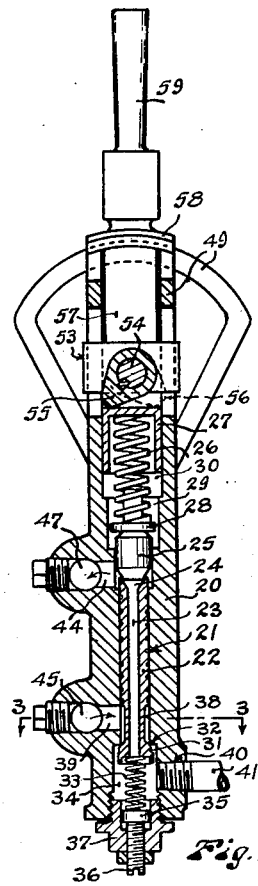
Fig. 2
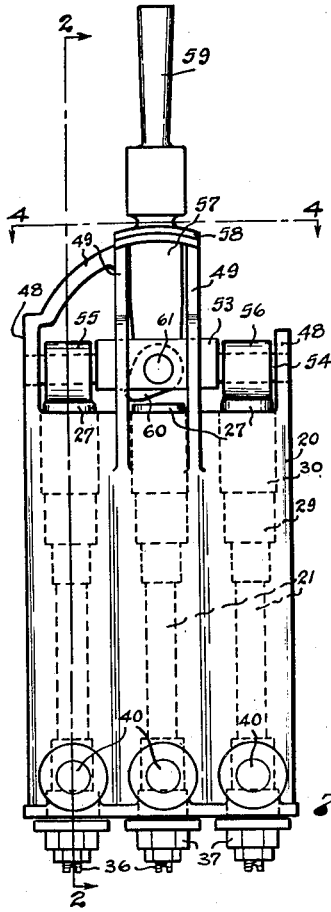
Fig. 1
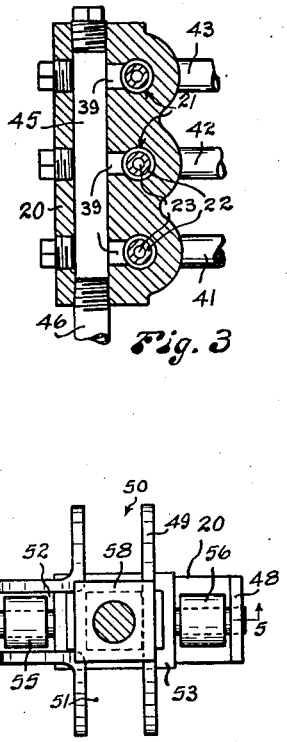
Fig. 3
Fig. 4
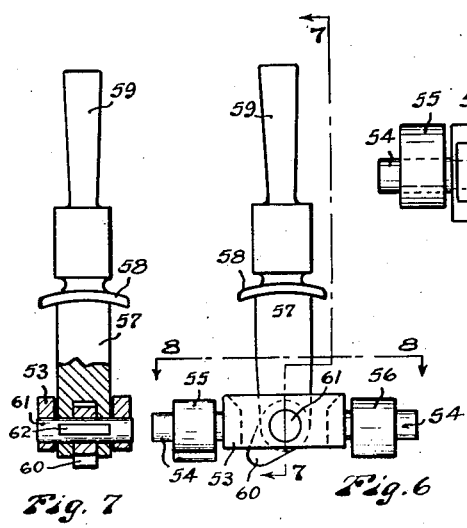
Fig. 7   Fig. 8   Fig. 6
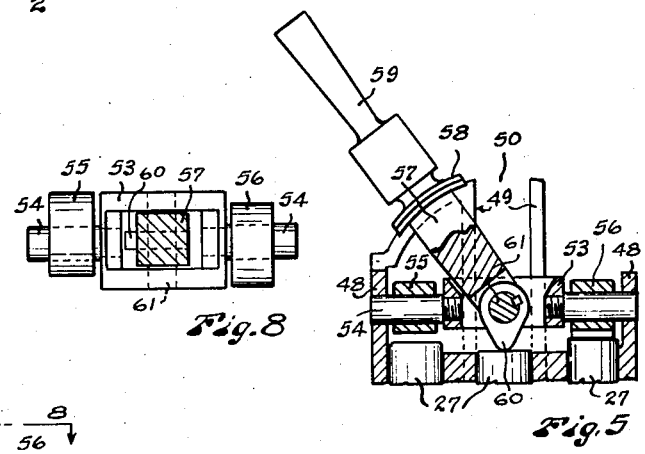
Fig. 5
INVENTOR
Merian H. Dickinson
BY
ATTORNEY

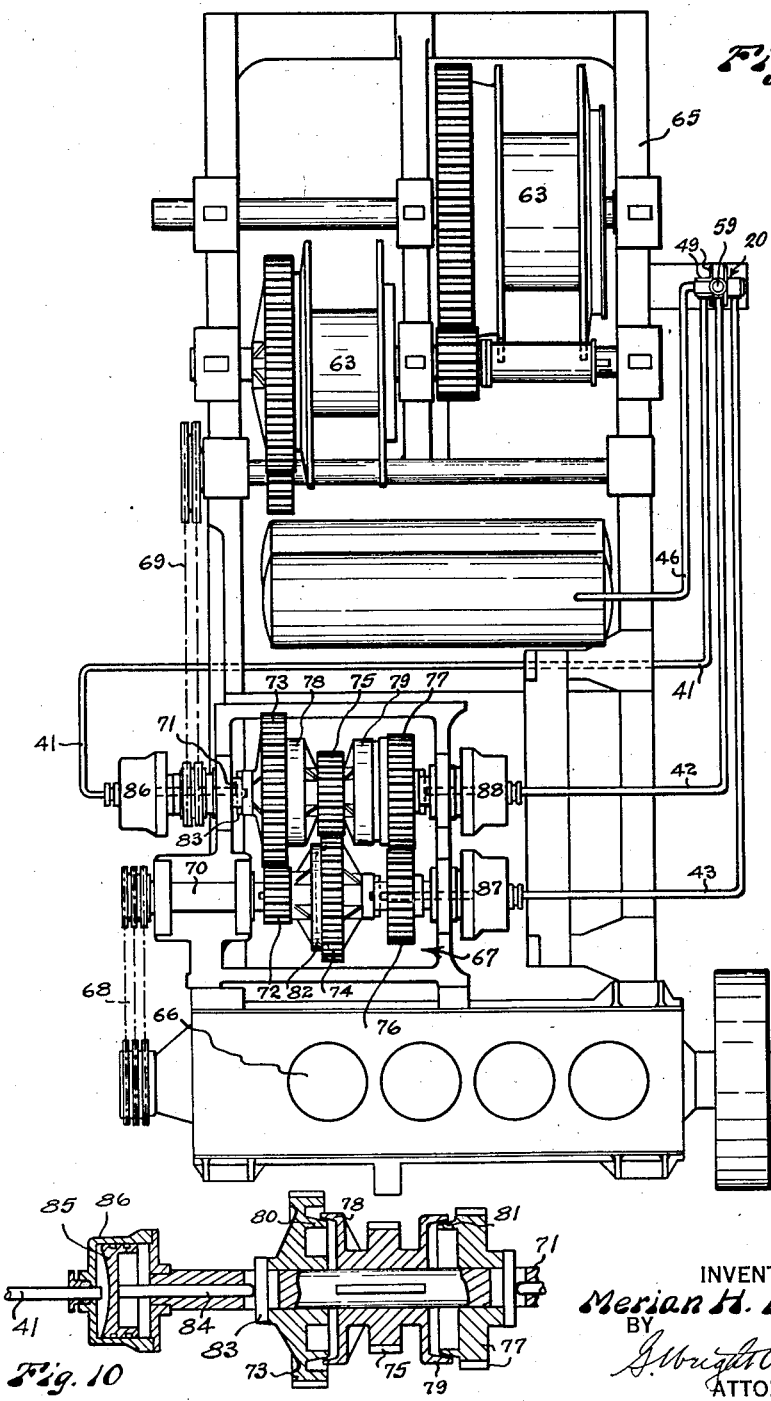

Sept. 19, 1933.  M. H. DICKINSON  1,927,700
FLUID PRESSURE MULTIPLE VALVE CONTROL
Filed Oct. 13, 1930  3 Sheets-Sheet 3
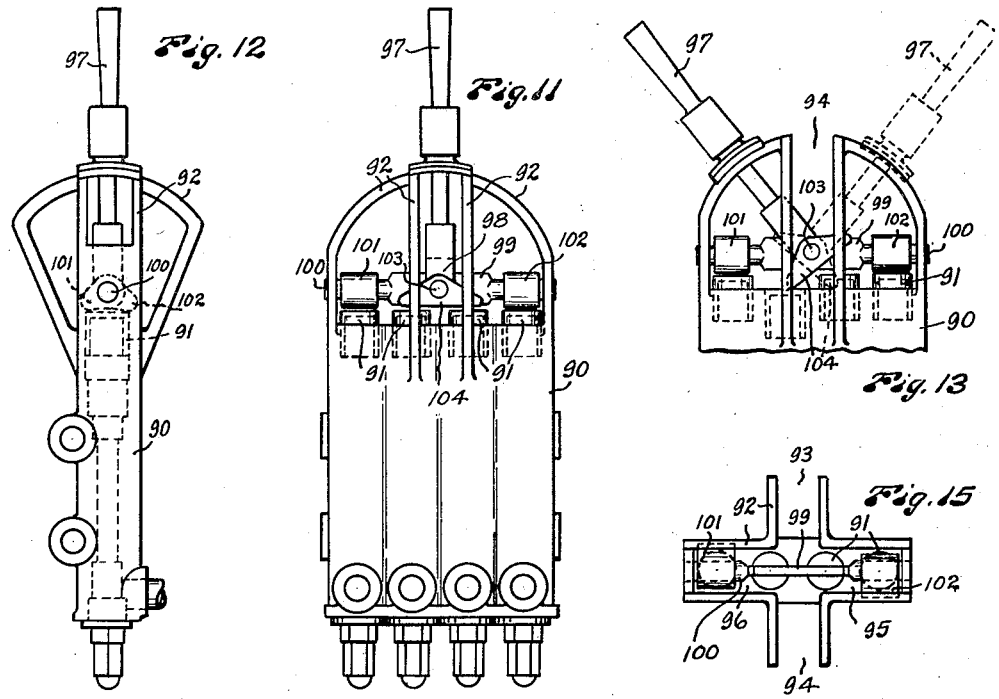
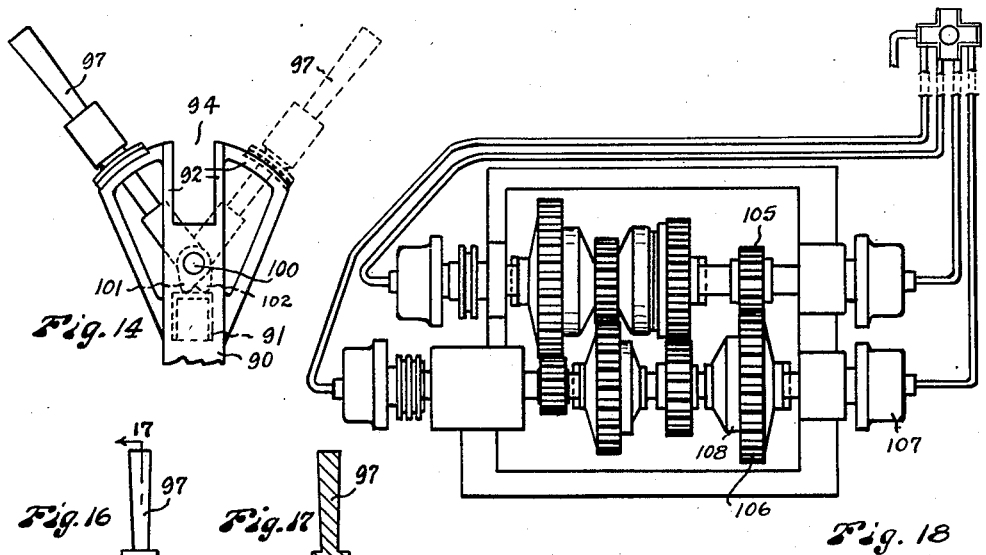
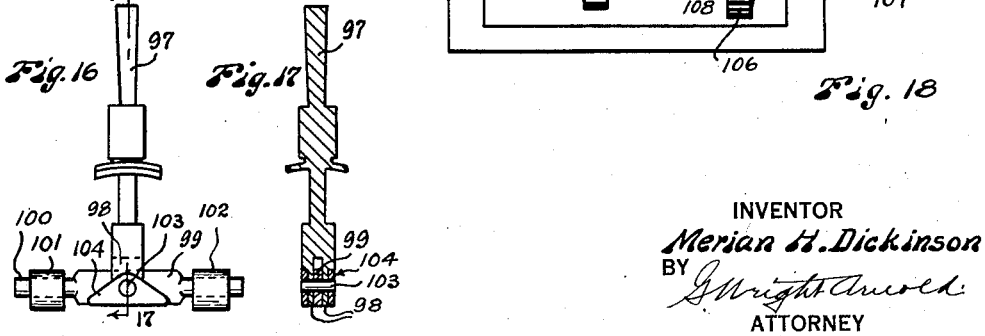
INVENTOR
Merian H. Dickinson
BY
ATTORNEY Patented Sept. 19, 1933

1,927,700

UNITED STATES PATENT OFFICE 1,927,700

FLUID PRESSURE MULTIPLE VALVE CONTROL

Merian H. Dickinson, Seattle, Wash.

Application October 13, 1930. Serial No. 488,403

12 Claims. (Cl. 303—52).

My invention relates to a fluid pressure multiple valve control means. More particularly, my invention relates to a single selective control means for operating a plurality of fluid pressure valves, and is in the nature of an improvement on Patent No. 1,566,111, issued December 15, 1925, to Thomas Spencer Miller.

For purposes of clearness and definiteness of illustration, I will describe my invention as applied to a three or four speed transmission conveying the power from a Diesel, gasoline or electric logging engine to the drum mechanism operating the main line and the haulback for logging operations. However, it will be distinctly understood that my invention is not to be restricted to any such specific application but is co-extensive with all situations where like conditions and problems obtain. My invention is directed particularly to solving the problem of converting steam equipment used for logging into gasoline, Diesel or electric equipment. My invention is also particularly directed to the building of new equipment using such power for logging use.

In logging, it has been common practice to use steam power for driving the drums because of the inherent nature and flexibility of this power. If more power is needed, it is easily obtained by merely opening the throttle and thereby the desired power can be obtained at any speed. This type of power is undesirable because of high cost of production, large amount of labor required in the operation thereof, and the fire hazard incident to steam boilers. It has, therefore, been found desirable to replace this type of power with gasoline, Diesel or alternating current electric motors, however, such motors are required to run at a substantially constant predetermined speed to develop the required power and a selective variable speed multiple gear transmission is required.

The type of selective multiple gear transmission commonly used in and about motor cars and trucks has been found insufficient because it requires too much of the operator's time to operate such mechanism and because this type of mechanism is too slow in operation and is not flexible enough to meet the requirements of logging operations. Furthermore, the gears required to carry the load in this type of transmission, are large and heavy and would be subjected to much wear by continued meshing and unmeshing of the same. It is to be remembered the operator of a logging engine is generally a considerable distance from the log he is hauling and generally is unable to see the log. In such cases he is required to obtain his information as to the condition of the territory thru which he is hauling and whether his tow has fouled or encountered obstacles as other logs or trees, from the conditions of the mainline and haulback. If he decides that more or less power or more or less speed is required on the lines, he must have a mechanism that will respond instantly. He must also have his clutch and selective gears available by a simple operation so that his time may be given to properly operating his lines.

In Patent No. 1,566,111 hereinbefore mentioned, a single selective device for operating a reverse and forward drum is disclosed, but heretofore there has been a great need felt in the industry for a fluid pressure multiple valve control means, whereby three or four valves could be instantly operated selectively by a single means, positively preventing the operation of more than one of the valves at one time. My device not only fills this need but has the additional feature of pressure control.

My cams that operate the valves provide a ready means for graduating the openings of the valves, whereby any pressure from zero to the total pressure on the air line may be selectively applied by the operator. Obviously, pawls or projecting end portions may be substituted for my cams and in mechanisms where graduated pressure control is not required, the valves may be changed to provide either full pressure or no pressure on the fluid pressure operated device.

An important object of the invention is to provide a multiple valve control means which has a single handle for selectively operating a plurality of valves, said handle being connected with a cam shaft by pivotal means whereby the cam shaft may be oscillated to cause cams thereon to operate certain of the valves when the handle is moved in a crosswise direction relative to the cam shaft, said handle being arranged to be oscillated independently of the cam shaft in a direction lengthwise of said cam shaft without moving the cam shaft, said handle having other cams directly connected with its pivoted end portion for operating others of said valves when said handle is oscillated independently of said cam shaft. Operatively disposed in spaced apart relation to the cams on the shaft and on the end portion of the handle, are the operating plungers of a series of valves. The number may be any number from one to four inclusive. These valves are all in the same plane and economical construction of the assembly is afforded by such alignment. There is a guide means with slots directing and limiting the movement of the handle in two planes at substantially right angles and affording an inoperative central or neutral position where the lever handle is required to start before movement in the various directions to operate a valve. It is advisable for the convenience of the operators, if less than four valves are used, that the guide means corresponding to the unused positions of the handle be obstructed or left off. As the handle oscillates lengthwise relative to the shaft, there is no movement of the shaft and in each extreme position of oscillation a valve is engaged by the cams on the handle while in the center no valve is engaged and the handle is in neutral position. As the handle oscillates in a plane at right angles to the one just described, it will oscillate the shaft and in each extreme position of its oscillation in this plane, a valve will be engaged while in the center again we will have a neutral position. In this latter plane of oscillation the cams on the pivoted end portion of the lever will also oscillate, however, they will oscillate in the same plane of oscillation of the handle lever, or at ninety degrees to the plane in which they normally operate to engage their respective valves. These cams are sufficiently spaced relative to the valves and so designed in shape that they will only operate the valves when oscillating in their normal operating plane.

In the multiple valve control means embodying my invention a shaft is pivotally connected to the guide frame housing. A center yoke with stub shafts to pivotally connect this yoke to the said housing and/or a yoke with pivotal points on the said housing in spaced apart relation and operatively disposed to suitable bearing means on the yoke may be obviously substituted for said shaft. If a shaft is used, it may be in cross section, round, square, rectangular, round with the sides flattened or other suitable shape. In the center of the shaft is a pin and mounted thereon is the bifurcated end portion of the lever handle. It is obvious that the lever handle will be operative if the end portion is a single member. However, such a handle will be much weaker mechanically than one with a bifurcated end portion for the purpose desired. In operation, the handle will oscillate on the pin, through the shaft, and moving in a plane at substantially right angles thereto, the handle will oscillate the shaft. For strength, and therefore my preferred embodiment, it is advisable that the handle should be provided with a bifurcated end portion with inner flat sides, slidably mounted on a shaft with outer parallel flat sides and/or a yoke portion should be provided on the shaft with inner flat sides and interposed therebetween should be a handle with outer flat sides. In either of these constructions, the handle, as it oscillates the shaft, has two places, one on the pin and the other on the flat side portions where the load is carried.

The above mentioned general objects of my invention, together with others inherent in the same, are attained by the device illustrated in the following drawings, the same being a preferred exemplary form of embodiment of my invention, throughout which drawings like reference numerals indicate like parts:

Figure 1 is a front elevation of a multiple valve control device constructed in accordance with my invention embodying three valve members;

Fig. 2 is a sectional view of the same substantially on broken line 2—2 of Fig. 1;

Fig. 3 is a cross section substantially on broken line 3—3 of Fig. 2;

Fig. 4 is a view partly in section and partly in plan substantially on broken line 4—4 of Fig. 1;

Fig. 5 is a fragmentary sectional view substantially on broken line 5—5 of Fig. 4, parts being shown in elevation;

Fig. 6 is a detached side elevation of a handle and cam shaft embodied in the invention;

Fig. 7 is a view partly in section and partly in side elevation substantially on broken line 7—7 of Fig. 6;

Fig. 8 is a view partly in plan and partly in section substantially on broken line 8—8 of Fig. 6;

Fig. 9 is a plan view showing my valve installed on logging apparatus in connection with a three speed power transmission;

Fig. 10 is a fragmentary sectional view of one form of a fluid pressure operated device in connection with which my multiple valve control means may be used;

Fig. 11 is a front elevation showing my invention embodied in a four valve control member;

Fig. 12 is a side elevation of the same;

Fig. 13 is a fragmentary front elevation of said four valve control member showing one operative position of the valve handle in full lines and another operative position of said valve handle in broken lines, said two positions being the operating positions for the two inside valve members;

Fig. 14 is a similar view showing the two operating positions of the valve handle for the two outside valve members;

Fig. 15 is a plan view with the handle removed, looking down on guide frame means and showing the cam shaft and cams thereon together with the top ends of the valve plungers;

Fig. 16 is a detached side elevation of the cam shaft and valve handle;

Fig. 17 is a sectional view substantially on broken line 17—17 of Fig. 16; and

Fig. 18 is a fragmentary plan view of a four speed transmission on which my four valve control member may be used.

In Figs. 1 to 10 inclusive, I have shown my invention embodied in a three valve control which is used for governing the flow of fluid under pressure to a three speed transmission on a piece of logging equipment.

This valve embodies a valve housing 20 having three parallel tubular bores 21, see Figs. 1 and 3, extending lengthwise therethrough. The three bores 21 have duplicate valve mechanisms disclosed therein, said valve mechanisms each being similar to the valve mechanism in Patent No. 1,566,111 hereinbefore identified. One of said valve mechanisms is hereinafter briefly described.

Referring especially to Fig. 2, the bore 21 has a valve tube 22 slidably disposed therein. Said valve tube 22 has a longitudinal bore 23 which terminates at its upper end in an expanding seat 24 for the reception of the lower end of a separable valve plug 25. A compression spring 26, disposed within a slidably mounted inverted cup shaped plunger 27 is arranged to exert a downward pressure on a disc 28 which rests on the top end of the valve plug 25. The disc 28 and the plunger 27 are slidably disposed within enlarged portions 29 and 30 respectively, at the upper end of the bore 21, and suitable means hereinafter described are provided for exerting a downward pressure on the plunger 27. At the lower end, the valve tube 22 is provided with a valve member 31 which is held against a seat 32 by a compression spring 33. The valve member 31 is operatively disposed within a larger chamber 34 at the lower end of the bore 21 and the spring 33 is adjustably supported by a disc 35 and screw 36, which is threaded through a cap or plug 37 at the bottom end of the valve housing. The valve tube 22 is provided with a portion 38 of reduced external diameter just above the valve member 31 on the lower end thereof.

Each valve tube has an inlet port 39 for fluid under pressure, and an outlet port 40 through which such fluid under pressure may flow through pipes 41, 42 or 43 to any mechanism to be actuated and an exhaust port 44 is provided through which fluid returning from the pipes 41, 42, and 43 and the valve passageways 23, may discharge. The several outlet ports 40 are separate from each other and communicate with separate pipes 41, 42 and 43, see Fig. 9, which lead to separate devices. The several inlet ports 39 may all connect with a common chamber 45 into which fluid may enter through a pipe 46, see Figs. 3 and 9, and the several exhaust ports 44 may all connect with a similar common chamber 47 through which the fluid may exhaust. The chamber 46 is shown in cross section in Fig. 3. The chamber 47, which is shown only in Fig. 2, is similar to the chamber 46 shown in Fig. 3. When the valve is in use, pressure will always be supplied to the inlet ports 45 and will enter into the space around the valve tube 22 formed by portion 38 of reduced diameter but this pressure will not tend to unseat the valve member 31 as the pressure is in both directions. If pressure is exerted mechanically on the plunger 27, this pressure will be transmitted through the stronger compression spring 26 and members 28, 25 and 22 and will compress the lighter spring 33 and unseat the valve 31, thus allowing fluid under pressure to flow through the outlet port 40 and pipe 41, or 42 or 43 to any desired pressure actuated device. While the pressure is being exerted on the plunger 27, the valve plug 25 will be pressed tightly against the seat 24 of the valve tube 22 and the fluid under pressure cannot flow upwardly through said tube. As soon as pressure on the plunger 27 is released, fluid pressure will unseat the valve plug 25 and permit exhaust of the pressure from pipe 41 or 42 or 43 through the passageway 23, ports 44 and exhaust chamber 47.

Extending above the top of the valve housing 20 are guide members 49, which, together with the valve housing 20, form guide frame means. Guide members 49 include two oppositely disposed bearing brackets 48 and said guide members 49 are of arcuate shape and are spaced apart and cooperate to form three guide slots 50, 51 and 52, which guide slots extend in three directions from a central location directly over the middle valve member, as more clearly shown in Fig. 4.

An oscillatory member, hereinafter termed a shaft, is journaled in the bearing lugs 48. In the disclosure illustrated in Figs. 1 to 10 inclusive, this shaft is made up of a center yoke 53 having an open rectangular center and having two relatively rigid coaxial stub shafts 54 extending from opposite ends thereof, said stub shafts being mounted in the brackets 48. The stub shafts 54 are respectively provided with relatively fixed cams 55 and 56 which extend in opposite directions and are operatively disposed in engagement with the upper ends of the plungers 27 of the two respective valve members, at the sides of the housing 20. When the stub shafts 54 and yoke 53 are in the position shown in Figs. 1 and 2, the cams will be in close proximity to the plungers 27, but will not exert any substantial pressure thereon. If the stub shafts 54 are rocked in one direction, one of the cams 55 or 56 will depress the plunger 27 of one of the valves while if said stub shafts are rocked in the opposite direction, the plunger 27 of the other side valve will be depressed by one of said cams 55 or 56.

An operating lever, hereinafter termed a handle is provided for operating the valves. This operating lever has a shank 57, preferably of square cross section and is provided with a cap member 58 and terminates at its upper end in a hand hold portion 59. The lower end of the shank is bifurcated for the reception of a cam 60 and said bifurcated shank portion is adapted to fit within the opening in the yoke 53 and is pivotally mounted on a pin 61 which extends crosswise of the yoke 53. The cam 60 is rigidly secured to the handle shank 57 as by a key 62 which secures both the cam 60 and the bifurcated ends of the shank 57 to the pivot pin 61, or by any other suitable means. The opening in the yoke 53, which receives the bifurcated end of the handle shank, is relatively long, whereby oscillation of the handle in a direction lengthwise of the yoke and shafts 54 is permitted without moving the shafts, but oscillation of the handle in a plane at right angles to the shaft will oscillate the shaft. The handle is thus pivotally mounted on the cam shaft for independent oscillation or movement in one direction relative to the shaft and said handle is operatively disposed to oscillate the shaft when it is moved in an opposite direction. When the handle is in the inclined position shown in Fig. 5, the center valve plunger 27 will be depressed by the cam 60 but when said handle is moved back into the neutral position shown in Fig. 1, the cam 60 will release the center valve plunger and permit this valve to exhaust. The cams 55, 56, and 60 afford selective means for opening any desired valve and provide a means for controlling the degree of the pressure for any pressure operated device. The form and shape of these cams may be varied as desired and, while they are herein termed cams, they may be considered as pawls or as short lever arms.

In Fig. 9, I have shown one form of logging apparatus on which my multiple valve control means may be used, said apparatus comprising winding drums 63, mounted on a frame 65 and arranged to be driven by an internal combustion motor 66 through a three speed transmission, designated generally at 67. The transmission 67 is connected with the motor by link belt means 68 and with the drums by other link belt means 69.

The transmission 67 may comprise two shafts 70 and 71 having permanently meshed pairs of gearwheels 72—73, 74—75 and 76—77 thereon. The two gearwheels of each pair are of different size and afford three different gear ratios between the driving shaft 70 and the driven shaft 71. Gearwheels 72, 75 and 76 may be non-rotatably mounted on their respective shafts while the other gearwheels 73, 74 and 77 may be loosely and rotatably mounted on the shafts. Two clutch elements 78 and 79 are secured to the gearwheel 75 or otherwise non-rotatably mounted on the shaft 71 and arranged to be engaged by cooperating clutch elements 80 and 81 respectively, which are rigid with the respective gearwheels 73 and 77, see Fig. 10. In a similar manner a clutch element 82 is secured to the fixed gearwheel 72 and is arranged to be engaged by a clutch element, not shown, on the gearwheel 74. Each gearwheel 73, 74 and 77, which is loose on its shaft, is provided with means by which it may be pressed against its respective adjacent clutch member. In the instance of the gearwheel 73, a cross key 83 at the end of the hub of said gearwheel is engaged by a thrust pin 84 which thrust pin is operated by a piston 85 or equivalent device in a fluid pressure cylinder 86. This cylinder 86 is connected by the pipe 41 with one of the ports 40 of the control valve so that fluid pressure may be admitted to move the piston 85 and press the gearwheel 73 against the clutch element 78, thereby frictionally engaging said gearwheel with said clutch element 78 and establishing a low speed drive through gears 72 and 73 and clutch element 78 to the shaft 71, the other gears being positively released by the selective pressure control means from their respective clutch elements so that they will idle when the low speed drive is thus established.

In a similar way fluid pressure cylinders 87 and 88 are provided for the respective gearwheels 74 and 77 and are connected by the pipes 43 and 42 respectively with the control valve. When the fluid pressure cylinders 86, 87 and 88 are thus connected with the control valve it will be obvious that any desired pressure may be supplied to any one of said cylinders but that all of said cylinders will be open to exhaust each time the valve handle is moved to the neutral position, thus making it impossible to establish a driving relation through more than one set of gears at a time.

In Figs. 11 to 19 inclusive, I have shown a four valve pressure control device constructed in accordance with my invention and adapted to control a four speed transmission. In this device the internal valve mechanism is similar to that in the three valve unit, the four valve chambers being placed side by side in a valve housing 90 and having plungers 91, which may extend above the top of said housing and correspond to the previously described plungers 27. Guide means 92 forming four guide slots 93, 94, 95 and 96 disposed at angular intervals of substantially ninety degrees and all opening toward a common center, which constitutes the neutral position for a valve control handle 97. The lower end of the valve control handle 97 may be forked or bifurcated as at 98 to fit over a flattened central portion 99 of a cam shaft 100, which has cams 101 and 102 mounted thereon, said cams corresponding in purpose and function and mode of operation to the previously described cams 55 and 56 and serving when the shaft 100 is oscillated to depress one or the other of the outside plungers 91 and open the valve controlled thereby.

The bifurcated end portion of the valve control handle 97 is pivotally mounted on the flattened portion 99 of the cam shaft 100 by a pivot 103 whereby said handle may be oscillated in a longitudinal direction relative to the cam shaft without moving said cam shaft. The bifurcated end portion 98 has one or more cams or pawls 104 rigidly secured thereto and projecting in the longitudinal direction of the shaft so that one end of said cam or cams 104 is positioned over the plunger 91 at one side of said handle and the other end of said cam or cams is positioned over the plunger 91 at the other side of said handle.

From the above description it will be apparent that oscillation of the handle 97 on the pivot 103 into either of the positions shown in Fig. 13, will cause one of the two inside plungers 91 to be depressed while oscillation of the said lever in a crosswise direction relative to the cam shaft 100 into the positions shown in Fig. 14 will oscillate said cam shaft 100 and cause the cams 101 or 102 to depress one or the other of the outside plungers.

The control device shown in Figs. 12 to 17 may be used for controlling the flow of fluid under pressure to a four speed transmission in the manner illustrated in Fig. 18. This transmission may be similar to the transmission shown in Fig. 9 except that an additional or fourth set of gears 105—106 may be provided, there being an additional or fourth fluid pressure operated device 107 and clutch member 108 provided for rendering these gears operative.

Obviously, changes may be made in the form, dimensions and arrangement of the parts of my invention, without departing from the principle thereof, the above setting forth only a preferred form of embodiment.

I claim:

1. A device of the character described, embodying a plurality of fluid pressure valves; and a single selective control means operatively disposed with respect to said valves, comprising a guide frame, a shaft pivotally mounted in said frame for oscillation with respect to said frame, cams fixedly mounted on said shaft and operatively disposed as respects certain of said valves, a handle pivotally mounted on said shaft for oscillation with respect to said shaft and operatively disposed to oscillate said shaft, and cams fixedly mounted on said handle and operatively disposed as respects the other of said valves.

2. A device of the character described, embodying a plurality of fluid pressure valves; and a single selective control means operatively disposed with respect to said valves, comprising, a guide frame, a shaft pivotally mounted in said frame for oscillation with respect to said frame, cams fixedly mounted on said shaft and operatively disposed as respects at least one of said valves, a handle pivotally mounted on said shaft for oscillation with respect to said shaft and operatively disposed to oscillate said shaft, and cams fixedly mounted on said handle and operatively disposed as respects at least one of said valves.

3. A device of the character described, embodying a plurality of fluid pressure valves; and a single selective control means operatively disposed with respect to said valves, comprising a guide frame, a center yoke, shafts fixedly mounted on either end of said center yoke, said yoke and said shafts being pivotally mounted in said frame for oscillation with respect to said frame, cams fixedly mounted on said shafts and operatively disposed as respects certain of said valves, a handle pivotally mounted on said yoke for oscillation in one direction with respect to said yoke and operatively disposed to oscillate said yoke in another direction, and cams fixedly mounted on said handle and operatively disposed as respects the other of said valves.

4. A device of the character described, embodying a plurality of fluid pressure valves; and a single selective control means operatively disposed with respect to said valves, comprising a guide frame, a center yoke, shafts fixedly mounted on either end of said center yoke, said yoke and said shafts being pivotally mounted for oscillation with respect to said frame, cams fixedly mounted on said shafts and operatively disposed as respects at least one of said valves, a handle pivotally mounted on said yoke for oscillation in one direction with respect to said yoke and operatively disposed to oscillate said yoke in another direction, and cams fixedly mounted on said handle and operatively disposed as respects at least one of said valves.

5. A device of the character described, embodying a plurality of fluid pressure valves; and a single selective control means operatively disposed with respect to said valves, comprising a guide frame, a shaft pivotally mounted in said frame for oscillation with respect to said frame, cams fixedly mounted on said shaft and operatively disposed as respects certain of said valves, a handle terminating in a bifurcated end portion, said end portion being pivotally mounted on said shaft for oscillation with respect to said shaft and operatively disposed to oscillate said shaft, and cams fixedly mounted on the bifurcated end portion of said handle and operatively disposed as respects the other of said valves.

6. A device of the character described, embodying a plurality of fluid pressure valves; and a single selective control means operatively disposed with respect to said valves, comprising a guide frame, a shaft pivotally mounted in said frame for oscillation with respect to said frame, cams fixedly mounted on said shaft and operatively disposed as respects at least one of said valves, a handle terminating in a bifurcated end portion, said end portion being pivotally mounted on said shaft for oscillation with respect to said shaft and operatively disposed to oscillate said shaft, and cams fixedly mounted on the bifurcated end portion of said handle and operatively disposed as respects at least one of said valves.

7. A device of the character described, embodying a plurality of fluid pressure valves; and a single selective control means operatively disposed with respect to said valves, comprising a guide frame, a shaft pivotally mounted in said frame for oscillation with respect to said frame on the longitudinal axis of said shaft, cams fixedly mounted on said shaft and operatively disposed as respects certain of said valves, a handle pivotally mounted on said shaft for oscillation in the longitudinal direction of said shaft and freely movable as respects said shaft in this direction and operatively disposed to oscillate said shaft on its longitudinal axis, and cams fixedly mounted on said handle and operatively disposed as respects the other of said valves.

8. A device of the character described, embodying a plurality of fluid pressure valves; and a single selective control means operatively disposed with respect to said valves, comprising a guide frame, comprising mounting means for a shaft, mounting means for said valves and a handle guide means embodying a central position and a plurality of handle guide slots terminating in said central position, a shaft pivotally mounted in said frame for oscillation with respect to said frame, cams fixedly mounted on said shaft and operatively disposed as respects certain of said valves, a handle pivotally mounted on said shaft for oscillation with respect to said shaft and operatively disposed to oscillate said shaft, said handle being operatively disposed as respects said handle guide frame, whereby the said valves may be selectively operated one at a time, and cams fixedly mounted on said handle and operatively disposed as respects the other of said valves.

9. A device of the character described, embodying a plurality of fluid pressure valves; and a single selective control means operatively disposed with respect to said valves, comprising a guide frame, comprising mounting means for a shaft, mounting means for said valves and handle guide means embodying two intersecting handle guide slots arranged at substantially right angles to each other, a shaft pivotally mounted in said frame for oscillation with respect to said frame, cams fixedly mounted on said shaft and operatively disposed as respects certain of said valves, a handle pivotally mounted on said shaft for oscillation with respect to said shaft and operatively disposed to oscillate said shaft, said handle being operatively disposed as respects said handle guide frame, whereby the said valves may be selectively operated one at a time, and cams fixedly mounted on said handle and operatively disposed as respects the other of said valves.

10. In combination, three fluid pressure operated devices; a source of fluid under pressure; three valve members, provided with operating plungers mounted in spaced relation to each other, controlling the flow of fluid under pressure to the respective devices and each constructed and arranged to maintain a predetermined pressure in the associated fluid pressure operating device; a single means operatively positioned as respects said operating plungers for selectively operating all of said valves, and means preventing engagement of the said valve plunger operating means with more than one valve plunger at one time.

11. In combination, four fluid pressure operated devices; a source of fluid under pressure; four valve members, provided with operating plungers mounted in spaced relation to each other, controlling the flow of fluid under pressure to the respective devices and each constructed and arranged to maintain a predetermined pressure in the associated fluid pressure operating device; a single means operatively positioned as respects said operating plungers for selectively operating all of said valves, and means preventing engagement of the said valve plunger operating means with more than one valve plunger at one time.

12. In combination, three or more fluid pressure operated devices; a source of fluid under pressure; three or more valve members, provided with operating plungers mounted in spaced relation to each other, controlling the flow of fluid under pressure to the respective devices and each constructed and arranged to maintain a predetermined pressure in the associated fluid pressure operating device; a single means operatively positioned as respects said operating plungers for selectively operating all of said valves, and means preventing engagement of the said valve plunger operating means with more than one valve plunger at one time.

MERIAN H. DICKINSON.